(12) United States Patent
Katagiyama et al.

(10) Patent No.: US 8,956,056 B2
(45) Date of Patent: Feb. 17, 2015

(54) OPTICAL CONNECTOR CAPABLE OF ASSEMBLING THEREIN OPTICAL FIBER LED OUT FROM REAR OF FERRULE AND OPTICAL CONNECTOR SYSTEM CONTAINING SAME

(75) Inventors: Naoki Katagiyama, Tokyo (JP); Yuichi Koreeda, Tokyo (JP); Hisaya Takahashi, Tokyo (JP); Mikio Oda, Tokyo (JP); Hideyuki Ono, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 621 days.

(21) Appl. No.: 13/321,894

(22) PCT Filed: May 17, 2010

(86) PCT No.: PCT/JP2010/058262
§ 371 (c)(1),
(2), (4) Date: Jan. 31, 2012

(87) PCT Pub. No.: WO2010/137480
PCT Pub. Date: Dec. 2, 2010

(65) Prior Publication Data
US 2012/0141072 A1    Jun. 7, 2012

(30) Foreign Application Priority Data
May 25, 2009  (JP) .................... 2009-125410

(51) Int. Cl.
*G02B 6/38* (2006.01)
*G02B 6/00* (2006.01)

(52) U.S. Cl.
CPC ............ *G02B 6/3885* (2013.01); *G02B 6/3861* (2013.01); *G02B 6/3869* (2013.01)
USPC ............................... 385/72; 385/76

(58) Field of Classification Search
USPC .................... 385/72, 76, 78, 88–90
See application file for complete search history.

(56) References Cited

U.S. PATENT DOCUMENTS 5,129,024 A * 7/1992 Honma ........................... 385/76
2005/0201692 A1   9/2005 De Marchi

FOREIGN PATENT DOCUMENTS

| JP | 4-102809 | 4/1992 |
| JP | 5-346519 | 12/1993 |
| JP | 11-14862 | 1/1999 |
| JP | 2002-098860 A | 4/2002 |
| JP | 2004-109161 | 4/2004 |
| JP | 2005-531020 A | 10/2005 |
| JP | 2007-279114 A | 10/2007 |

OTHER PUBLICATIONS

International Search Report of PCT/JP2010/058262, date of mailing Jun. 15, 2010.
Japanese Office Action in JP 2009-125410, Oct. 23, 2013, with English translation.

* cited by examiner

*Primary Examiner* — Akm Enayet Ullah
(74) *Attorney, Agent, or Firm* — Collard & Roe, P.C.

(57) ABSTRACT

An optical connector has a pair of coil springs (30) which are disposed so as to sandwich an optical fiber (50) led out of the rear of a ferrule (20) in substantially the axial direction (A) and which extend in the axial direction (A).

10 Claims, 8 Drawing Sheets

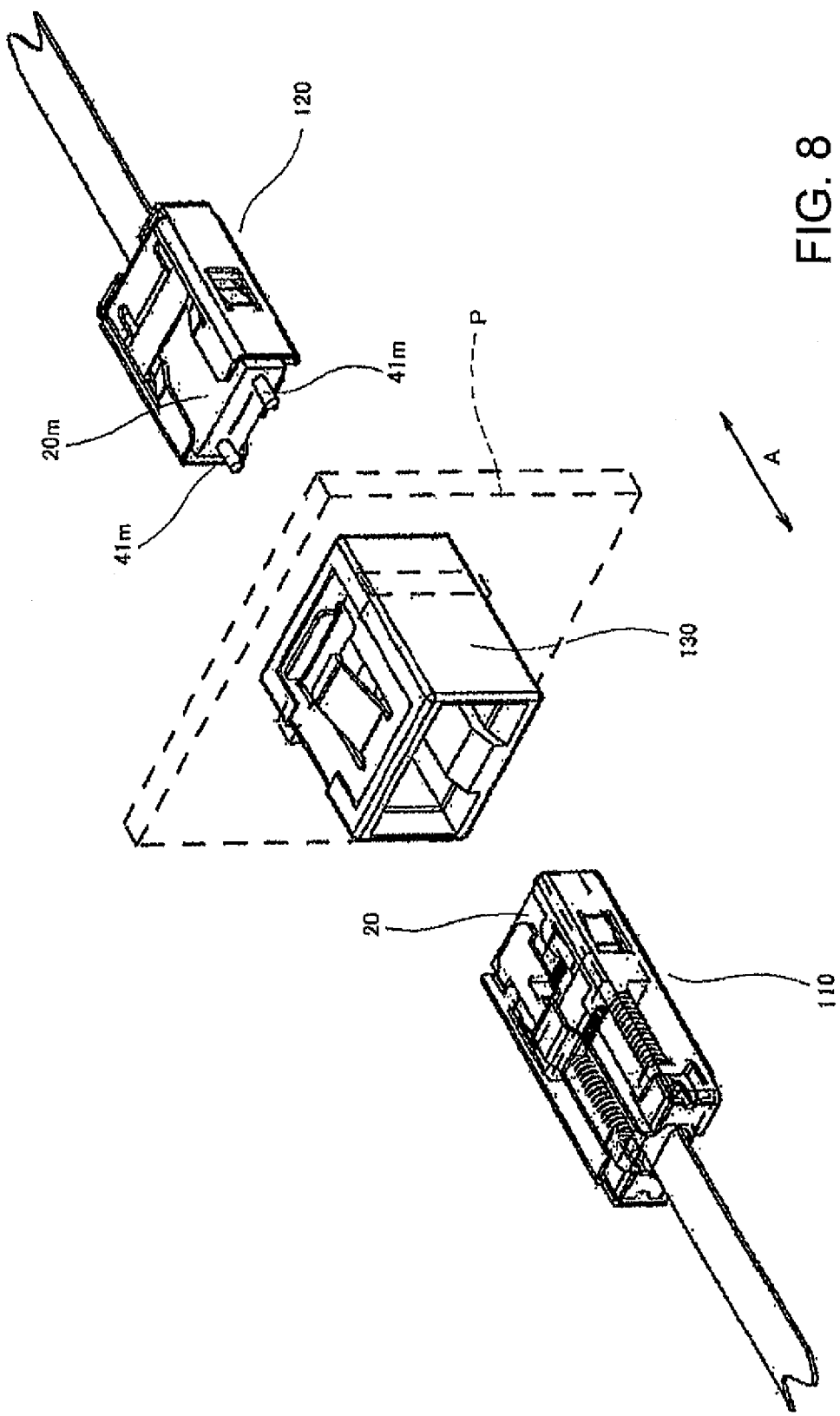

OPTICAL CONNECTOR CAPABLE OF ASSEMBLING THEREIN OPTICAL FIBER LED OUT FROM REAR OF FERRULE AND OPTICAL CONNECTOR SYSTEM CONTAINING SAME

CROSS REFERENCE TO RELATED APPLICATIONS

This application is the National Stage of PCT/JP2010/058262 filed on May 17, 2010, which claims priority under 35 U.S.C. §119 of Japanese Application No. 2009-125410 filed on May 25, 2009. The international application under PCT article 21(2) was not published in English.

TECHNICAL FIELD

This invention relates to an optical connector comprising a ferrule slidably disposed in a housing and a biasing means for pressing the ferrule, abutting a ferrule of a mating optical connector, against the ferrule of the mating optical connector.

BACKGROUND ART

Referring to FIG. 1, an optical connector of this type comprises a generally tubular housing comprising a front housing 62, a ferrule 70 disposed in the housing so as to be slidable in axial directions A and holding a single-core optical fiber 100, and a coil spring 91 disposed behind the ferrule 70 in the housing and serving to press the ferrule 70, abutting a ferrule of a mating optical connector (not illustrated), against the ferrule of the mating optical connector. The optical fiber 100 led out of the rear of the ferrule 70 passes through the coil spring 91, i.e. its coil. In other words, the coil spring 91 is loosely fitted around the optical fiber 100.

Referring to FIG. 2, another optical connector of this type comprises a generally tubular housing 60', a ferrule 70' disposed in the housing 60' so as to be slidable in axial directions A and holding a multi-core optical fiber 100', and a coil spring 91' disposed behind the ferrule 70' in the housing 60' and serving to press the ferrule 70', abutting a ferrule of a mating optical connector, against the ferrule of the mating optical connector. The optical fiber 100' led out of the rear of the ferrule 70' passes through the coil spring 91', i.e. its coil. In other words, the coil spring 91' is loosely fitted around the optical fiber 100'.

Optical connectors of this type, other than those shown in FIGS. 1 and 2, are also disclosed in, for example, Patent Documents 1 and 2. The optical connectors disclosed in these documents also have, as a biasing means for a ferrule, a coil spring loosely fitted around an optical fiber led out of the rear of the ferrule.

PRIOR ART DOCUMENT

Patent Document

Patent Document 1: JP-A-H11-14862
Patent Document 2: JP-A-2004-109161

SUMMARY OF THE INVENTION

Problem to be Solved by the Invention

Since the optical connectors shown in FIGS. 1 and 2 and the optical connectors disclosed in Patent Documents 1 and 2 are configured such that the coil spring as the biasing means for the ferrule is loosely fitted around the optical fiber, it is necessary that, in assembly thereof, optical fiber core wires be fixedly bonded to the ferrule after the coil spring is mounted on the optical fiber in advance.

Herein, the process of bonding the optical fiber core wires to the ferrule is a process comprising, by the use of jigs and tools, accurately placing the optical fiber core wires, applying an adhesive thereto, and further, drying and curing the adhesive, which thus requires much labor and time. On the other hand, almost all processes before and after this bonding process are processes that require only simple operations of fitting components together. In terms of consistent optical connector assembly, it is not rational to have such a bonding process, between the simple fitting processes, in which the operation contents are different in nature from those in the simple fitting processes, in which the tools and jigs to be used are different, and further, which requires much labor and time. Further, there is a possibility of failure to mount the coil spring before the bonding process or a possibility of damage to the optical fiber by the coil spring mounted in advance.

Patent Document 1 describes that the coil spring can be mounted on the optical fiber after the optical fiber core wires are bonded to the ferrule. However, passing the optical fiber through a spiral gap of the coil spring is a difficult operation that requires much labor and time and, even if it is possible, the possibility is high to damage the optical fiber and, therefore, it is not practical.

It is therefore an object of this invention to provide an optical connector that can be assembled easily in a short time.

Means for Solving the Problem

According to an aspect of this invention, there is provided an optical connector comprising a generally tubular housing, a ferrule disposed in the housing so as to be slidable in a fitting/removal direction with respect to a mating optical connector, and a biasing means disposed behind the ferrule in the housing and serving to press the ferrule, abutting a ferrule of the mating optical connector, toward the ferrule of the mating optical connector. The biasing means comprises at least one spring which is disposed adjacent to an optical fiber led out of the rear of the ferrule in the fitting/removal direction with respect to the mating optical connector.

The springs may be a pair of coil springs extending in the fitting/removal direction with respect to the mating optical connector and sandwiching the optical fiber.

The optical connector may further comprise a pair of guide pins disposed in the housing so as to sandwich the optical fiber and extending in the fitting/removal direction with respect to the mating optical connector. In the aspect, the ferrule has a pair of guide hole portions formed for allowing the pair of guide pins to pass therethrough, respectively. The pair of guide pins pass through the pair of coil springs, respectively.

The housing may have a locking claw that is flexible and that prohibits the ferrule from being detached from the housing and, when bent, allows the ferrule to be detached from the housing.

The optical connector may further comprise a pin holding member holding base ends of the pair of guide pins, wherein the pin holding member has a cutout portion for avoiding the optical fiber and is detachably fitted in the housing.

The housing may have a cutout portion that is formed so as to extend in the fitting/removal direction with respect to the mating optical connector from a front end face of the housing to a rear end face thereof and that allows the optical fiber to pass therethrough.

Tips of the pair of guide pins may retreat from a front end of the ferrule. The pair of guide hole portions of the ferrule abutting the ferrule of the mating optical connector may allow tips of a pair of guide pins of the mating optical connector to be inserted thereinto.

When the ferrule is not abutting the ferrule of the mating optical connector, tips of the pair of guide pins may be flush with or retreat from a front end of the ferrule. When the ferrule abuts the ferrule of the mating optical connector, the tips of the pair of guide pins may protrude from the front end of the ferrule so as to be inserted into a pair of guide hole portions of the mating optical connector.

When the ferrule is not abutting the ferrule of the mating optical connector, the front end of the ferrule may be flush with or protrudes from a front end of the housing.

According to another aspect of this invention, there is provided an optical connector system comprising a first optical connector as the optical connector, a second optical connector as the mating optical connector, and an optical connector adapter holding the first and second optical connectors whose ferrules are adapted to abut each other.

Effect of the Invention

An optical connector according to this invention can be assembled easily in a short time.

BRIEF DESCRIPTION OF THE DRAWINGS

FIG. 8 is a perspective view showing an optical connector system according to an embodiment of this invention.

MODE FOR CARRYING OUT THE INVENTION

An optical connector according to this invention is an optical connector comprising a generally tubular housing, a ferrule disposed in the housing so as to be slidable in axial directions, and a biasing means disposed behind the ferrule in the housing and serving to press the ferrule, abutting a ferrule of a mating optical connector, against the ferrule of the mating optical connector.

In this optical connector, particularly, the biasing means comprises a pair of springs which are disposed so as to sandwich an optical fiber led out of the rear of the ferrule in substantially the axial direction.

With the above-mentioned configuration, it is not necessary to mount a coil spring on the optical fiber before fixedly bonding the optical fiber to the ferrule and thus, by fixedly bonding the optical fiber to the ferrule in advance, this optical connector can be assembled easily in a short time.

Embodiment

Hereinbelow, an embodiment of this invention will be described with reference to the drawings.

[Optical Connector]

Figure 1:
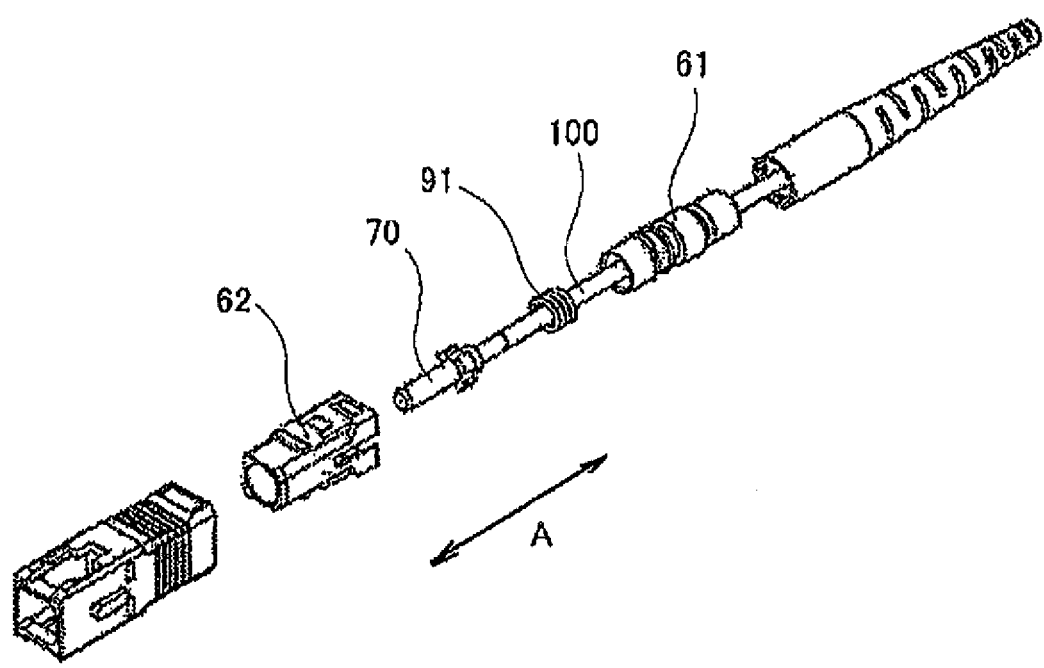
FIG. 1 is an exploded perspective view showing an optical connector according to a related art of this invention.
Figure 2:
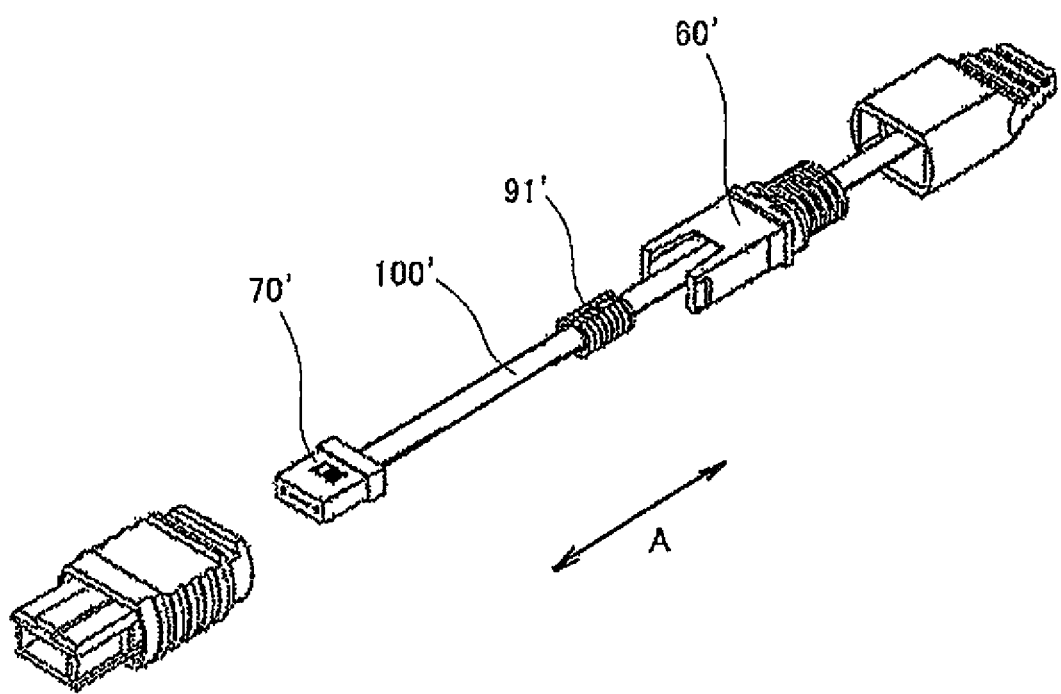
FIG. 2 is an exploded perspective view showing another optical connector according to a related art of this invention.
Figure 3:
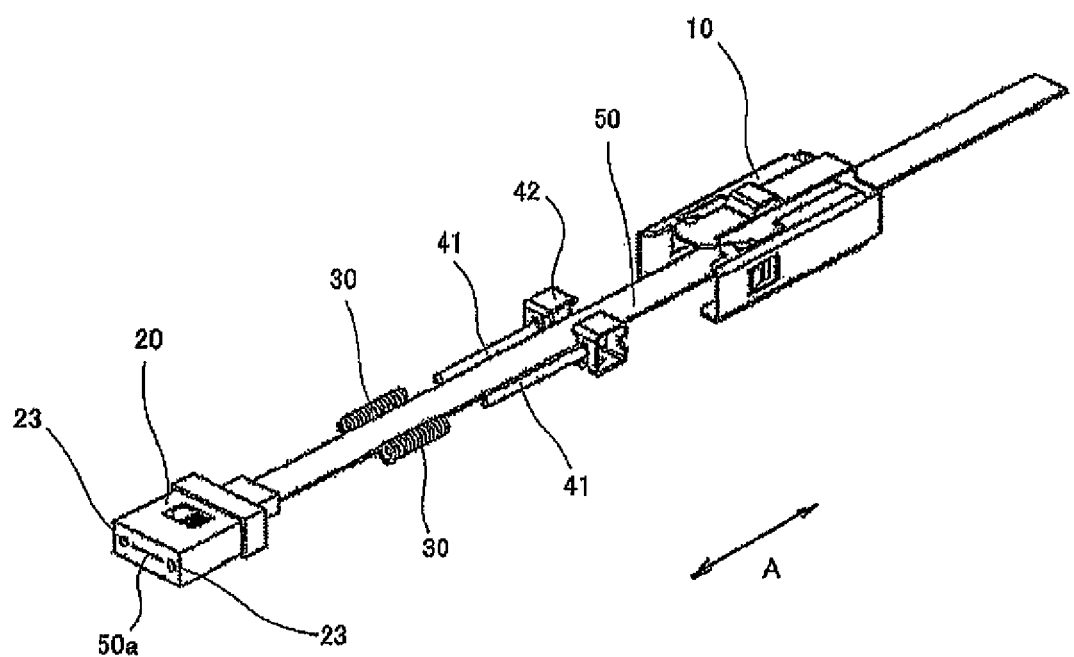
FIG. 3 is an exploded perspective view showing an optical connector according to an embodiment of this invention.
Figure 4:
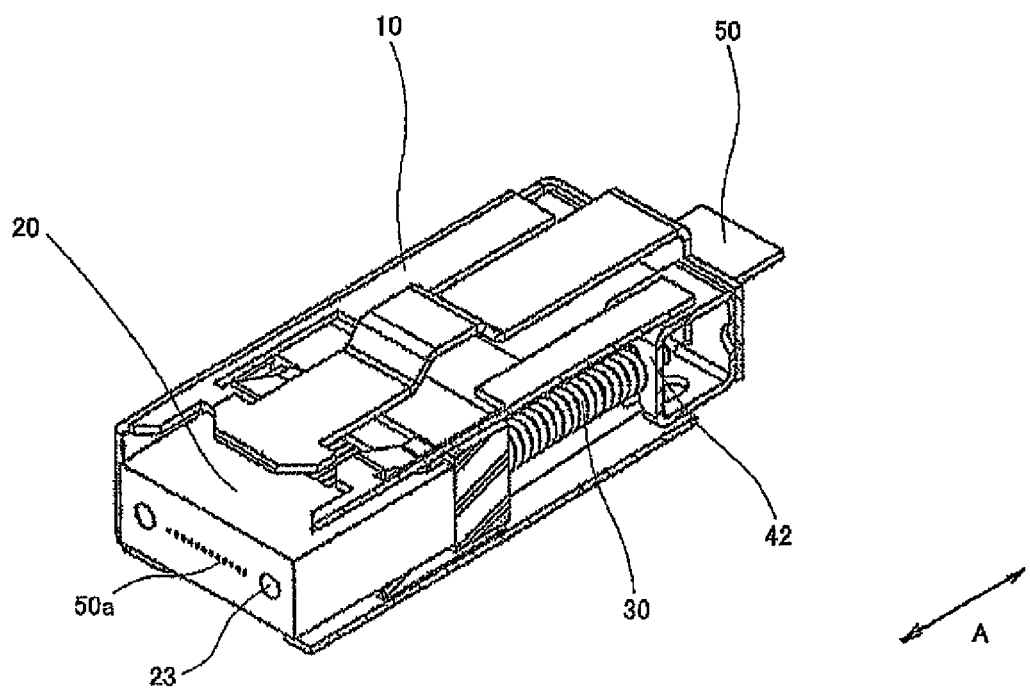
FIG. 4 is a perspective view, partially cut away, showing the optical connector shown in FIG. 3.

Referring to FIGS. 3 and 4, an optical connector according to the embodiment of this invention comprises, like the related arts shown in FIGS. 1 and 2, a generally rectangular tubular housing 10, a ferrule 20 disposed in the housing 10 so as to be slidable in axial directions A, and a biasing means disposed behind the ferrule in the housing 10 and serving to press the ferrule 20, abutting a ferrule of a mating optical connector, against the ferrule of the mating optical connector.

In particular, in this connector, the biasing means is in the form of a pair of coil springs 30 which are disposed so as to sandwich an optical fiber 50 led out of the rear of the ferrule 20 in substantially the axial direction A and which extend in the axial direction A. In this invention, the biasing means is not limited to a pair of coil springs and may be a pair of leaf springs or the like as long as it is a pair of springs that are disposed so as to sandwich the optical fiber led out of the rear of the ferrule. However, the pair of coil springs are more advantageous in miniaturizing the optical connector.

This connector further comprises a pair of guide pins 41 which are disposed in the housing 10 so as to sandwich the optical fiber 50 led out of the rear of the ferrule 20 in substantially the axial direction A and which extend in the axial direction A.

Figure 5:
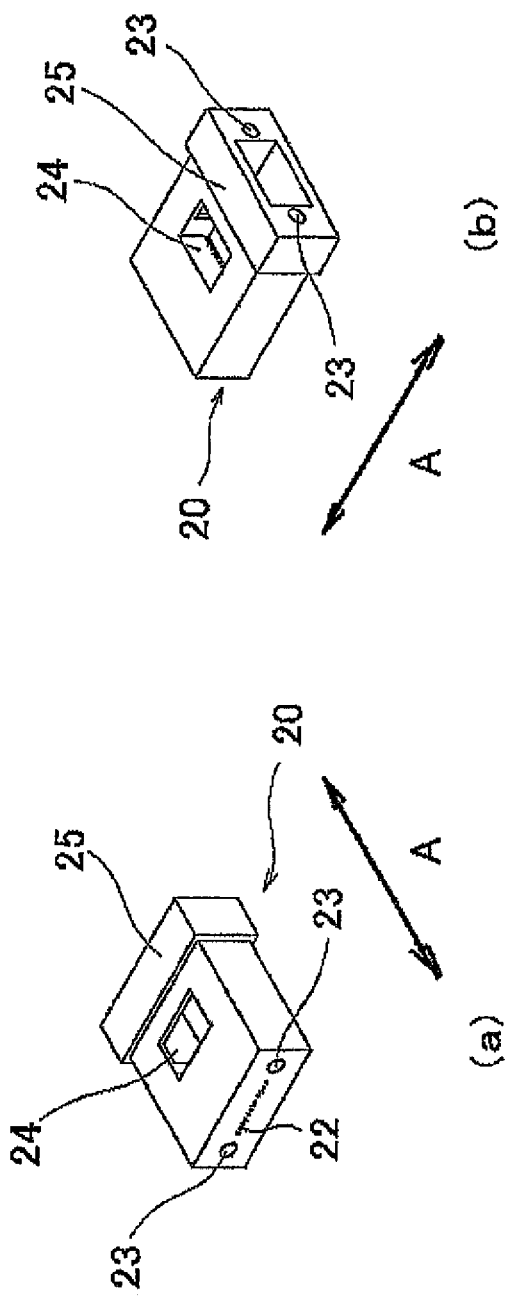
FIG. 5 shows, in perspective views (a) and (b), a ferrule of the optical connector shown in FIG. 3.

Referring to FIGS. 5 (a) and (b) in addition to FIGS. 3 and 4, the ferrule 20 has a pair of guide hole portions 23 formed for allowing the pair of guide pins 41 to pass therethrough.

The ferrule 20 further has a plurality of core wire holes 22 holding a plurality of optical fiber core wires 50a of the optical fiber 50, an adhesive pouring opening 24 for pouring an adhesive which is for fixedly bonding the optical fiber 50 whose optical fiber core wires 50a are held in the core wire holes 22, and a flange 25 which is locked by later-described locking claws 13 (FIGS. 6 (a) to (c)) of the housing 10.

As is clear from FIG. 4, when the ferrule 20 is not abutting the ferrule of the mating optical connector, a front end of the ferrule 20 is flush with or protrudes from a front end of the housing 10 and the pair of guide pins 41 are flush with or retreat from the pair of guide hole portions 23 at the front end of the ferrule 20. As a consequence, it is possible to easily clean the front end face that serves as an abutting surface against the ferrule of the mating optical connector. In order to prevent the ferrule 20 from retreating into the housing 10 during the cleaning, the housing 10 may be provided with a cutout for passing therethrough a finger of a cleaner or a jig for pressing the ferrule 20 or, alternatively, a concave/convex shape (not illustrated) may be formed between a later-described engaging claw 14 of the housing 10 and the sides of the housing 10 and the cleaning may be carried out by bending the engaging claw 14 into engagement with the concave/convex shape only during the cleaning, thereby pressing the ferrule 20 with the engaging claw 14.

Referring again to FIGS. 3 and 4, the pair of guide pins 41 pass through the pair of coil springs 30, respectively.

Figure 6:
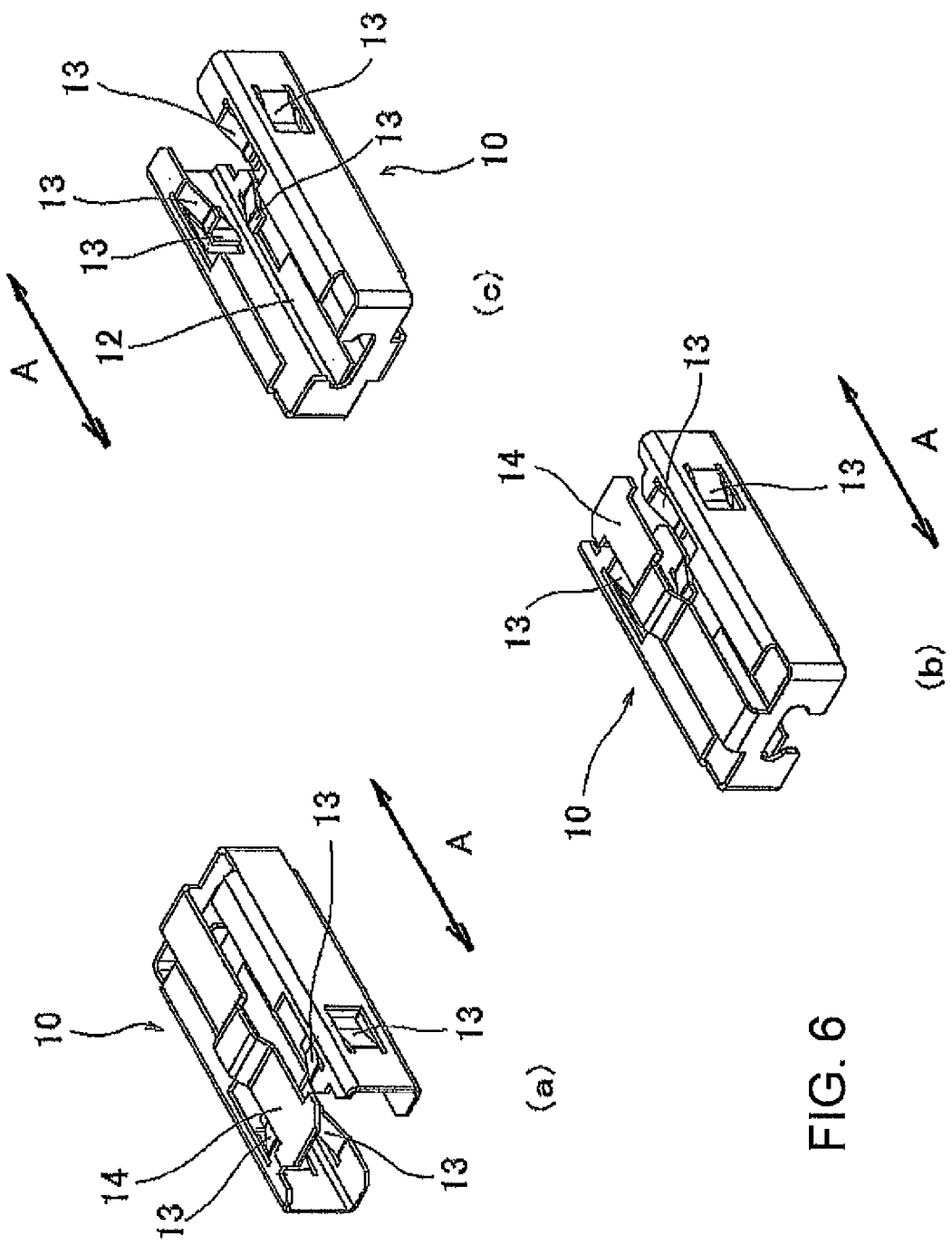
FIG. 6 shows, in perspective views (a) to (c), a housing of the optical connector shown in FIG. 3.

Referring to FIGS. 6 (a) to (c) in addition to FIGS. 3 and 4, the housing 10 has six locking claws 13 that are flexible and that prohibit the ferrule 20 from being detached from the housing 10 by locking the flange 25 of the ferrule 20 and, when bent, allow the ferrule 20 to be detached from the housing 10.

As is clear from FIG. 6 (c), the housing 10 has a cutout portion 12 that is formed so as to extend in the axial direction A from the front end face of the housing 10 to its rear end face and that allows the optical fiber 50 led out of the rear of the ferrule 20 in substantially the axial direction A to pass therethrough in assembly or maintenance of this optical connector.

Further, the housing 10 has the engaging claw 14 adapted to engage with a connector adapter 130 in a later-described optical connector system.

Figure 7:
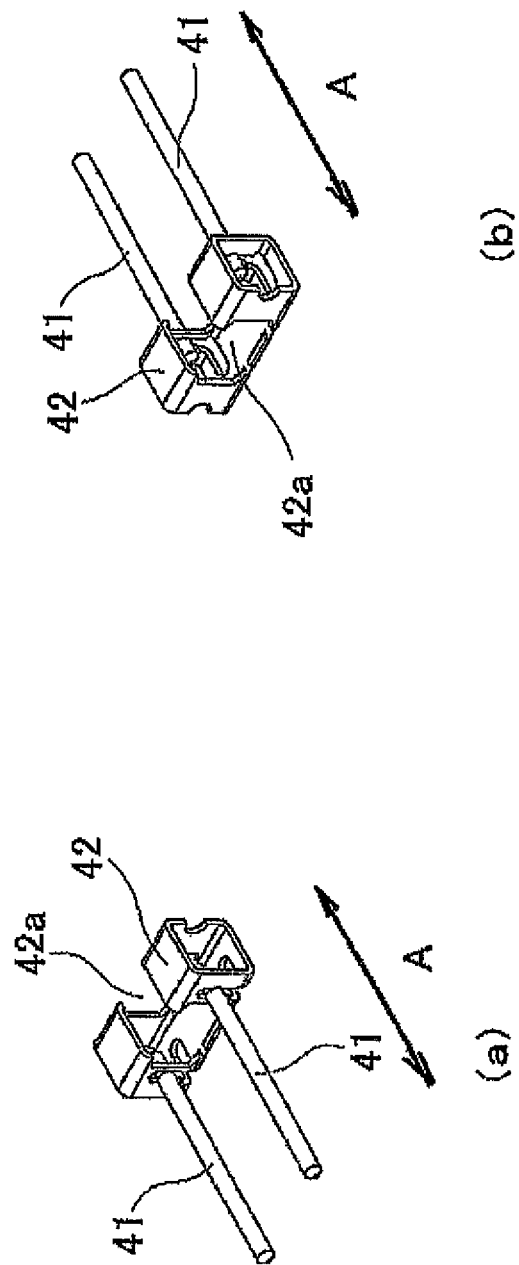
FIG. 7 shows, in perspective views (a) and (b), a pair of guide pins of the optical connector shown in FIG. 3.

Referring to FIGS. 7 (a) and (b) in addition to FIGS. 3 and 4, this optical connector further comprises a pin holding member 42 holding base ends of the pair of guide pins 41. The pin holding member 42 is detachably fitted in the housing 10. The pin holding portion 42 has a cutout portion 42a for avoiding the optical fiber 50 which is led out of the rear of the ferrule 20 in substantially the axial direction A and is movable in the axial directions A along with the ferrule 20.

This optical connector is assembled in the following manner.

Referring to FIGS. 5 (a) and (b) in addition to FIGS. 3 and 4, the optical fiber 50 cut to a required length is attached to the ferrule 20 in advance. Specifically, the plurality of core wires 50a at a front end of the optical fiber 50 are held in the plurality of core wire holes 22 of the ferrule 20 and the adhesive is poured from the adhesive pouring opening 24 and then is cured by a curing action caused by irradiation of an electromagnetic wave or application of heat, or the like. Further, as shown in FIGS. 7 (a) and (b), the pair of guide pins 41 are press-fitted into the pin holding member 42 in advance.

Referring to FIGS. 6 (a) to (c) in addition to FIGS. 3 and 4, the optical fiber 50 led out of the rear of the ferrule 20 is inserted through the cutout portion 12 of the housing 10 from above in FIG. 6 (c).

Then, the pin holding member 42 holding the pair of guide pins 41 is press-fitted into the housing 10 from its front opening along the axial direction A. In this event, the pair of coil springs 30 are loosely fitted around the pair of guide pins 41.

Finally, the ferrule 20 is inserted into the housing 10 from its front opening along the axial direction A. In this event, the tips of the pair of guide pins 41 are inserted into the pair of guide hole portions 23 from the rear of the ferrule 20 so that the ferrule 20 is precisely positioned in two axis directions perpendicular to the axial direction A. The ferrule 20 is inserted until its flange 25 rides over the vertices of the six locking claws 13 of the housing 10 to make a click sound and, thereafter, the ferrule 20 is prevented from being detached from the housing 10 unless the locking claws 13 are bent.

As described above, by fixedly bonding the optical fiber 50 to the ferrule 20 in advance, this optical connector can be assembled very easily in a short time.

[Optical Connector System]

Referring to FIG. 8, an optical connector system according to the embodiment of this invention comprises a first optical connector 110 as the optical connector according to this embodiment shown in FIGS. 3 and 4, a second optical connector 120 as the mating optical connector thereof, and a connector adapter 130 adapted to be attached to a panel P of a housing of an optical device or an optical electronic device and to hold the first optical connector 110 and the second optical connector 120 whose ferrules are adapted to abut each other. In FIG. 8, the first optical connector 110 is shown with its inside virtually seen through.

Regardless of whether or not the ferrule 20 of the first optical connector 110 abuts a ferrule 20m of the second optical connector 120, the tips of the pair of guide pins of the first optical connector 110 retreat from the front end of the ferrule 20. Therefore, it is configured that the pair of guide hole portions of the ferrule 20 abutting the ferrule 20m of the second optical connector 120 allow the tips of a pair of guide pins 41m of the second optical connector 120 to be inserted thereinto. With this configuration, the ferrules of the first optical connector 110 and the second optical connector 120 are precisely positioned in the two axis directions perpendicular to the axial direction A.

Alternatively, although not illustrated, it may be configured that when the ferrule of the first optical connector is not abutting the ferrule of the second optical connector, the tips of the pair of guide pins of the first optical connector are flush with or retreat from the front end of the ferrule and that when the ferrule of the first optical connector is pressed against the ferrule of the second optical connector, the tips of the pair of guide pins of the first optical connector protrude from the front end of the ferrule so as to be inserted into a pair of guide hole portions formed in the ferrule of the second optical connector. Also with this configuration, the ferrules of the first optical connector and the second optical connector are precisely positioned in the two axis directions perpendicular to the axial direction.

Although the coil springs 30 are disposed on both sides of the optical connector 50 in this embodiment, it is needless to say that the coil spring 30 may be disposed on only one side thereof.

Hereinbelow, various embodiment modes of this invention will be listed.

1. An optical connector comprising a generally tubular housing, a ferrule disposed in the housing so as to be slidable in a fitting/removal direction with respect to a mating optical connector, and a biasing means disposed behind the ferrule in the housing and serving to press the ferrule, abutting a ferrule of the mating optical connector, toward the ferrule of the mating optical connector, wherein the biasing means comprises at least one spring which is disposed adjacent to an optical fiber led out of the rear of the ferrule in the fitting/removal direction with respect to the mating optical connector.

2. An optical connector according to item 1, wherein the springs are a pair of coil springs extending in the fitting/removal direction with respect to the mating optical connector and sandwiching the optical fiber.

3. An optical connector according to item 2, further comprising a pair of guide pins disposed in the housing so as to sandwich the optical fiber and extending in the fitting/removal direction with respect to the mating optical connector, wherein the ferrule has a pair of guide hole portions formed for allowing the pair of guide pins to pass therethrough, respectively, and the pair of guide pins pass through the pair of coil springs, respectively.

4. An optical connector according to any one of items 1 to 3, wherein the housing has a locking claw that is flexible and that prohibits the ferrule from being detached from the housing and, when bent, allows the ferrule to be detached from the housing.

5. An optical connector according to item 3 or 4, further comprising a pin holding member holding base ends of the pair of guide pins, wherein the pin holding member has a cutout portion for avoiding the optical fiber and is detachably fitted in the housing.

6. An optical connector according to any one of items 1 to 5, wherein the housing has a cutout portion that is formed so as to extend in the fitting/removal direction with respect to the mating optical connector from a front end face of the housing to a rear end face thereof and that allows the optical fiber to pass therethrough.

7. An optical connector according to any one of items 3 to 6, wherein tips of the pair of guide pins retreat from a front end of the ferrule and the pair of guide hole portions of the ferrule abutting the ferrule of the mating optical connector allow tips of a pair of guide pins of the mating optical connector to be inserted thereinto.

8. An optical connector according to any one of items 3 to 6, wherein when the ferrule is not abutting the ferrule of the mating optical connector, tips of the pair of guide pins are flush with or retreat from a front end of the ferrule and, when the ferrule abuts the ferrule of the mating optical connector, the tips of the pair of guide pins protrude from the front end of the ferrule so as to be inserted into a pair of guide hole portions of the mating optical connector.

9. An optical connector according to item 7 or 8, wherein when the ferrule is not abutting the ferrule of the mating optical connector, the front end of the ferrule is flush with or protrudes from a front end of the housing.

10. An optical connector system comprising a first optical connector as the optical connector according to any one of items 1 to 9, a second optical connector as the mating optical connector, and an optical connector adapter holding the first and second optical connectors whose ferrules are adapted to abut each other.

This application claims priority from Japanese Patent Application No. 2009-125410 filed on May 25, 2009, the disclosure of which is incorporated herein in its entirety by reference.

INDUSTRIAL APPLICABILITY

While this invention has been described with reference to the embodiment, it is needless to say that this invention can be changed in various ways without departing from the gist thereof.

DESCRIPTION OF SYMBOLS 10 housing
12 cutout portion
13 locking claw
14 engaging claw
20 ferrule
22 core wire hole
23 guide hole portion
24 adhesive pouring opening
25 flange
30 coil spring
41 guide pin
42 pin holding member
42a cutout portion
50 optical fiber
50a core wire
110 first optical connector
120 second optical connector
130 connector adapter
A axial direction (fitting/removal direction with respect to the mating optical connector)
P panel

The invention claimed is:

1. An optical connector comprising
a generally tubular housing,
a ferrule disposed in the housing so as to be slidable in a fitting/removal direction with respect to a mating optical connector, and
a biasing means disposed behind the ferrule in the housing and serving to press the ferrule, abutting a ferrule of the mating optical connector, toward the ferrule of the mating optical connector,
wherein the biasing means comprises at least one spring which is disposed adjacent to an optical fiber led out of the rear of the ferrule in the fitting/removal direction with respect to the mating optical connector,
wherein the housing has a cutout portion that is formed on a side surface of the housing so as to extend in the fitting/removal direction with respect to the mating optical connector from a front end face of the housing to a rear end face thereof and that allows the optical fiber to pass therethrough.

2. The optical connector according to claim 1, wherein the springs are a pair of coil springs extending in the fitting/removal direction with respect to the mating optical connector and sandwiching the optical fiber.

3. An optical connector comprising
a generally tubular housing,
a ferrule disposed in the housing so as to be slidable in a fitting/removal direction with respect to a mating optical connector, and
a biasing means disposed behind the ferrule in the housing and serving to press the ferrule, abutting a ferrule of the mating optical connector, toward the ferrule of the mating optical connector,
wherein the biasing means comprises at least one spring which is disposed adjacent to an optical fiber led out of the rear of the ferrule in the fitting/removal direction with respect to the mating optical connector,
the springs are a pair of coil springs extending in the fitting/removal direction with respect to the mating optical connector and sandwiching the optical fiber,
wherein the housing has a cutout portion that is formed on a side surface of the housing so as to extend in the fitting/removal direction with respect to the mating optical connector from a front end face of the housing to a rear end face thereof and that allows the optical fiber to pass therethrough,
the optical connector further comprises a pair of guide pins disposed in the housing so as to sandwich the optical fiber and extending in the fitting/removal direction with respect to the mating optical connector,
the ferrule has a pair of guide hole portions formed for allowing the pair of guide pins to pass therethrough, respectively, and
the pair of guide pins pass through the pair of coil springs, respectively.

4. The optical connector according to claim 1, wherein the housing has a locking claw that is flexible and that prohibits the ferrule from being detached from the housing and, when bent, allows the ferrule to be detached from the housing.

5. The optical connector according to claim 3, further comprising a pin holding member holding base ends of the pair of guide pins, wherein the pin holding member has a cutout portion for avoiding the optical fiber and is detachably fitted in the housing.

6. An optical connector comprising
a generally tubular housing,
a ferrule disposed in the housing so as to be slidable in a fitting/removal direction with respect to a mating optical connector, and
a biasing means disposed behind the ferrule in the housing and serving to press the ferrule, abutting a ferrule of the mating optical connector, toward the ferrule of the mating optical connector,
wherein the biasing means comprises at least one spring which is disposed adjacent to an optical fiber led out of the rear of the ferrule in the fitting/removal direction with respect to the mating optical connector,
the springs are a pair of coil springs extending in the fitting/removal direction with respect to the mating optical connector and sandwiching the optical fiber, wherein the housing has a cutout portion that is formed on a side surface of the housing so as to extend in the fitting/removal direction with respect to the mating optical connector from a front end face of the housing to a rear end face thereof and that allows the optical fiber to pass therethrough, the optical connector further comprises a pair of guide pins disposed in the housing so as to sandwich the optical fiber and extending in the fitting/removal direction with respect to the mating optical connector, the ferrule has a pair of guide hole portions formed for allowing the pair of guide pins to pass therethrough, respectively, the pair of guide pins pass through the pair of coil springs, respectively, tips of the pair of guide pins retreat from a front end of the ferrule, and the pair of guide hole portions of the ferrule abutting the ferrule of the mating optical connector allow tips of a pair of guide pins of the mating optical connector to be inserted thereinto.

7. An optical connector comprising a generally tubular housing, a ferrule disposed in the housing so as to be slidable in a fitting/removal direction with respect to a mating optical connector, and a biasing means disposed behind the ferrule in the housing and serving to press the ferrule, abutting a ferrule of the mating optical connector, toward the ferrule of the mating optical connector, wherein the biasing means comprises at least one spring which is disposed adjacent to an optical fiber led out of the rear of the ferrule in the fitting/removal direction with respect to the mating optical connector, the springs are a pair of coil springs extending in the fitting/removal direction with respect to the mating optical connector and sandwiching the optical fiber, wherein the housing has a cutout portion that is formed on a side surface of the housing so as to extend in the fitting/removal direction with respect to the mating optical connector from a front end face of the housing to a rear end face thereof and that allows the optical fiber to pass therethrough, the optical connector further comprises a pair of guide pins disposed in the housing so as to sandwich the optical fiber and extending in the fitting/removal direction with respect to the mating optical connector, the ferrule has a pair of guide hole portions formed for allowing the pair of guide pins to pass therethrough, respectively, the pair of guide pins pass through the pair of coil springs, respectively, when the ferrule is not abutting the ferrule of the mating optical connector, tips of the pair of guide pins are flush with or retreat from a front end of the ferrule, and when the ferrule abuts the ferrule of the mating optical connector, the tips of the pair of guide pins protrude from the front end of the ferrule so as to be inserted into a pair of guide hole portions of the mating optical connector.

8. The optical connector according to claim 6, wherein when the ferrule is not abutting the ferrule of the mating optical connector, the front end of the ferrule is flush with or protrudes from a front end of the housing.

9. The optical connector according to claim 7, wherein when the ferrule is not abutting the ferrule of the mating optical connector, the front end of the ferrule is flush with or protrudes from a front end of the housing.

10. An optical connector system comprising a first optical connector as the optical connector according to claim 1, a second optical connector as the mating optical connector, and an optical connector adapter holding the first and second optical connectors whose ferrules are adapted to abut each other.

* * * * *